United States Patent
Kressley

[15] 3,685,262
[45] Aug. 22, 1972

[54] SELF-LEVELING GRATELESS STACK GAS SCRUBBER

[72] Inventor: Leonard J. Kressley, 1708 Brenner, Saginaw, Mich. 48602

[22] Filed: May 25, 1970

[21] Appl. No.: 40,255

[52] U.S. Cl. .................................. 55/390, 55/474
[51] Int. Cl. .......................................... B01d 53/08
[58] Field of Search ............... 55/390, 474, 73, 79

[56] References Cited

UNITED STATES PATENTS

| 1,731,223 | 10/1929 | Brady | 55/474 X |
| 1,895,601 | 1/1933 | Beuthner | 55/79 |
| 2,718,339 | 9/1955 | Pankratz | 55/390 X |
| 2,834,119 | 5/1958 | Schaub | 55/390 X |

FOREIGN PATENTS OR APPLICATIONS

| 476,352 | 9/1928 | Germany | 55/474 |
| 522,573 | 4/1931 | Germany | 55/474 |

Primary Examiner—Robert L. Lindsay, Jr.
Attorney—Griswold & Burdick, Herbert D. Knudsen and C. E. Rehberg

[57] ABSTRACT

A counter-current solid-gas scrubber for the removal of $SO_2$ and other undesirable components from stack gas has been invented. The construction of the chamber allows self-leveling of the solids and continuous flow of particulate solids and gases without grates or agitation. The chamber has a plate on the inside which extends downwardly such that a space is formed below the plate. The plate has a gas exit formed by the space below.

2 Claims, 1 Drawing Figure

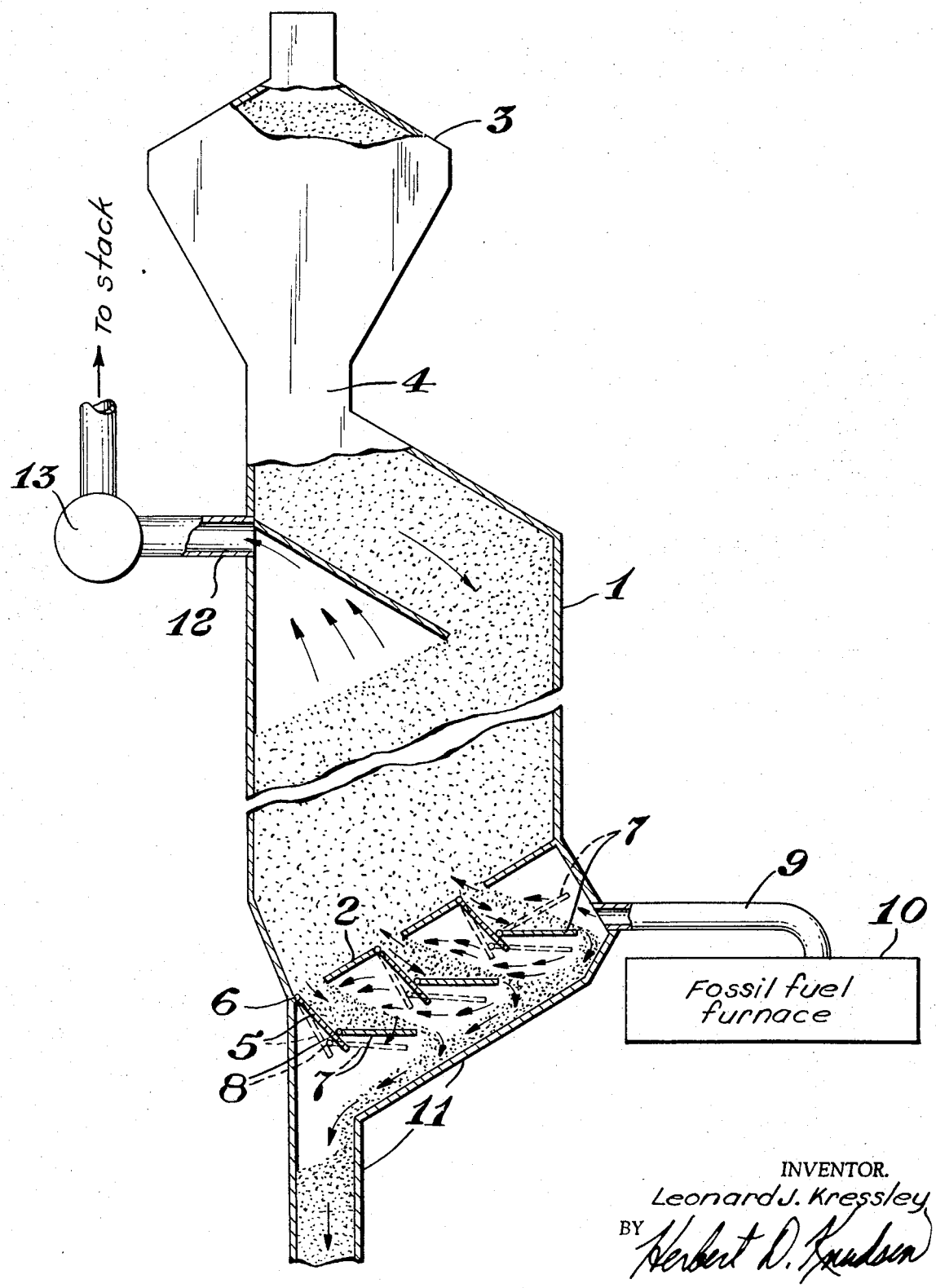

SELF-LEVELING GRATELESS STACK GAS SCRUBBER

BACKGROUND OF THE INVENTION

As concern regarding air pollution becomes more manifest, an intensive search for new methods of cleaning industrial stack gases has been made. These searches to date have produced a number of techniques which involve the contact of a solid with a gas. Since the solids in industrial applications are inactivated by the gas, recharging the solid or periodic regeneration is required. Conventional methods of adding and removing solids in contact with a gas are too burdensome to be of substantial economical applicability. Regeneration usually involves removal of the solid or termination of the flow.

Purification of stack gas by contact with a particulate solid to produce useful products appears to be a leading contender for the economical removal of a number of impurities from stack gas, especially for the removal of $SO_2$. Traditional concepts and methods of contacting a gas with a solid, however, cannot be readily applied to stack gas. Also, the excessive requirements of labor and materials has made recovery of these low margin products almost impossible on a commercial scale.

SUMMARY OF THE INVENTION

A novel apparatus for scrubbing stack gas has been invented in which particulate solids may be readily and economically contacted with a stack gas to remove various undesirable components from the stack gas, with the inexpensive recovery of spent solids for sale or use in other applications.

The novel stack gas scrubber is shown in one embodiment in the accompanying FIGURE.

Referring to the FIGURE, the apparatus of the invention consists of a housing defining a contact chamber having sides 1 for containing particulate solids, an exit for gas and a bottom 2 having a plurality of passageways to allow particles to leave the chamber and to allow flow of gas into the chamber. A feed means 3 is adjunct the contact chamber and connected to the chamber by a conduit 4 to feed new particulate solid into the contact chamber, preferably by gravity flow. Each passageway in the bottom of the housing has a first plate 5 pivotally mounted on the bottom of the housing around point 6 and extended downward from the bottom preferably forming an acute angle between its upper surface and the opening in the bottom of the chamber. A second plate 7 is pivotally mounted around point 8 on the first plate 5 and independent of the movement of the first plate so that plate 7 forms an obtuse angle with the upper surface of plate 5.

The preferred embodiments exemplified in the drawing show the bottom of the housing connected by a conduit 9 to a fossil fuel furnace 10 in such a way that gases given off by the furnace pass through the housing. Also shown connected to the bottom of the housing is a receiving means 11 attached in such a manner so that particulate matter discharged from the housing is deposited in the receiver.

Also preferred is conduit 12 attached to the top of the housing in such manner that the gases emitted from the housing are transferred through the conduit to a gas removal means 13 such as a fan which promotes the removal of gas from the housing and passes the gas removed to a stack.

In operation, the contact chamber and solid reservoir are filled with a porous solid with the passageways in the bottom of the housing adjusted to prevent the flow of the particulate solid. When filled, the particulate solid in the contact chamber falls in a free pile forming the angle of repose in the chamber which is characteristic of the solid. After filling the contact chamber with solid, the movably mounted plates are operated downward to allow particulate solid to flow from the contact chamber. The stack gas is fed through the bottom openings into the moving bed of particulate solid in the contact chamber. As the stack gas contacts the solid, soot and other particulate matter in the gas are removed by the filtering action of the solid, and undesirable components of the gas react with the solid and are removed. For example, the particulate solid may be sodium bicarbonate which reacts with $SO_2$ in the stack gas to form sodium sulfite or sodium sulfate. After the solid is reacted, it is removed through the passageways in the bottom and new solid automatically enters from the feed means. The comparative flow rates of the gas and particulate solid are adjusted to give the greatest efficiency of reaction and impurity removal.

The pivotal plates in the bottom may be adjusted in any convenient manner to regulate the flow of the particulate solid. The plates may have one particular setting that gives the desired flow on a continuous basis, or for slow moving beds, an oscillating action of the movable plates is preferred. This movement for slow beds is necessary because of the variable pressure of the solid from the reservoir and the omnipresent possibility that the system could become static. A continuous solid release for a relatively rapid flow is possible, on the other hand, because there is a smaller chance of the system becoming static at the high flow rates. For a slow moving bed, the movable plates of the bottom openings may be oscillated with complete stoppage in part of the cycle.

The contact chamber may be of essentially any design and length. In the preferred apparatus of the invention, however, the contact chamber has a rectangular horizontal cross-section with the conduit from the reservoir disposed along the length of one side of the contact chamber.

The bottom of the contact chamber may take substantially any form. Preferred, however, is a bottom which is essentially parallel to the angle of repose of the particulate solid pile. When the surface of the pile and the bottom of the contact chamber are essentially parallel, a bed of uniform thickness is formed. This uniform thickness is desirable because short paths through the bed are eliminated, and the gas flows constantly throughout the whole bed rather than having the choice of a path of lesser resistance.

The construction of the apparatus of the present invention may be altered substantially from application to application. Although the basic design is retained, different materials and construction techniques may be necessary to handle the particular chemical reaction, temperatures or particle removal.

The particular particulate solid charged into the apparatus is not critical. The important attribute of the solid is its permeability characteristic. The solids should allow relatively free passage of the stack gas through the system with a minimal pressure drop.

Representative examples of suitable particulate solids include porous sodium bicarbonate, potassium carbonate, alkalized alumina or the like. Although the apparatus of the present invention is not limited to any one solid or removal system, the removal of $SO_2$ with porous solid sodium bicarbonate is especially suited to the present apparatus.

SPECIFIC EMBODIMENTS

A stack gas from a commercial power plant containing fly ash and $SO_2$ among other components is passed into the apparatus shown in the figure which is filled with porous $NaHCO_3$ aggregates having a surface area of 3 meters per gram and an aggregate size of one-half inch. The $NaHCO_3$ removes the fly ash by a filtering action of the particulate solid and the $NaHCO_3$ reacts with the $SO_2$ to form $Na_2SO_4$. The spent particulate matter is allowed to intermittently flow from the contact chamber by the oscillatory action of the movable plate in the bottom opening. The spent particulate matter is discharged into a waiting railroad car and removed. The effluent gas is examined and found to contain only minute amounts of fly ash and $SO_2$.

In the same manner as described, other counter-current gas-solid systems may be constructed and operated to remove various objectionable components from stack gas.

The FIGURE, of course, shows a schematic drawing of the apparatus of the invention. Although this drawing shows one embodiment, the invention is in no way limited to this embodiment, but includes all equivalent apparatus.

I claim:
1. An apparatus for contacting a gas with a solid in a counter-current movement comprising
   a housing defining a contact chamber having an exit for gas, sides to contain a bed of particulate solid, and a bottom having a plurality of passages essentially parallel to the angle of repose of the particulate solid, each passage having a first plate pivotally mounted on the bottom of the housing and extended downward from the passageway and a second plate pivotally mounted on the first plate to form an obtuse angle with the upper surface of the first plate; and
   a feed means for particulate solid adjunct the housing and connected to the contact chamber by a conduit situated at the top of said contact chamber to permit gravity flow of said particulate solid through the contact chamber, said conduit comprising the upper portion of the sides of said housing and an inner plate connected to an inner periphery of said housing above a means defining an exit for gas, and extending at an angle downward whereby said conduit meets said contact chamber below the exit for gas; and
   an inlet for gas below the passages; and
   a receiving means below the passages to receive the particulate solid as it is discharged from the housing.
2. The apparatus of claim 1 wherein the first plate forms an acute angle with the passageway in the bottom of the housing.

* * * * *